US006799615B2

United States Patent
Smith

(10) Patent No.: US 6,799,615 B2
(45) Date of Patent: Oct. 5, 2004

(54) TENON MAKER

(76) Inventor: Leslie G. Smith, P.O. Box 1443, Olson Rd. & Yunk Rd., Cut Bank, MT (US) 59427

( * ) Notice: Subject to any disclaimer, the term of this patent is extended or adjusted under 35 U.S.C. 154(b) by 45 days.

(21) Appl. No.: 10/374,369

(22) Filed: Feb. 26, 2003

(65) Prior Publication Data
US 2003/0159758 A1 Aug. 28, 2003

Related U.S. Application Data
(60) Provisional application No. 60/359,583, filed on Feb. 26, 2002.

(51) Int. Cl.[7] .................................................. B27F 1/08
(52) U.S. Cl. .......................... 144/203; 144/198; 144/85; 144/134.1
(58) Field of Search .......................... 144/85, 82, 145.2, 144/134.1, 144.51, 145.1, 204.2, 198.1, 203

(56) References Cited
U.S. PATENT DOCUMENTS 4,287,627 A * 9/1981 Chambers ................... 144/2.1
4,768,903 A * 9/1988 Merritt Jr. ................ 144/154.5
5,127,452 A * 7/1992 Wilston ........................ 142/37
5,611,734 A * 3/1997 Beall ........................ 144/154.5

* cited by examiner

Primary Examiner—Allen Ostrager
Assistant Examiner—Shelly Self
(74) Attorney, Agent, or Firm—Donald W. Meeker

(57) ABSTRACT

A stand is made up of two channel shaped sides. There is a removable top that has holes drilled in it so a router with router bits of different diameters and shapes, such as round-nosed and straight router bits or heads, can be attached. There is a removable wood guide having a front with two wood guide sides attached to it. The electric router is the power source for the cutter. The round nose bit cuts the wood ends to form tenons of different diameters and shapes, such as radius, chamfered (tapered) or square-shouldered tenons. The top will be a flat surface with holes that will support a router and attach to the sides. The two channel shaped sides will include holes for attaching a top, securing it to a work bench, and attaching wood guides. The fronts will have different diameter holes, and will attach to wood guide sides. The wood guide sides will have a slot where a bolt can pass through to attach wood guides to channel sides.

16 Claims, 7 Drawing Sheets

TENON MAKER

CLAIM OF PROVISIONAL APPLICATION RIGHTS

This application claims the benefit of U.S. Provisional Patent Application No. 60/359,583, filed on Feb. 26, 2002.

BACKGROUND OF THE INVENTION

1. Field of the Invention

The present invention relates generally to tenon cutters and more specifically it relates to a tenon maker for making a cylindrical-shaped tenon on a wood end utilizing the power of a router.

2. Description of the Prior Art

Five thousand years ago, the throne of Egyptian king Tutankhamen was assembled using mortise-and-tenon joints pinned in place with dowels. Ancient Greek shipwrights assembled hulls by drilling holes and cutting mortises in abutting planks, inserting a drilled plate in the mortises, and driving a dowel home through slightly offset holes to draw the planks tight. The draw-tenon, as this joint is known, is now used only by a small group of traditional artisans, mainly in post-and-beam timber-framing and in the reproduction of historical furniture.

While it can be appreciated that tenon cutters have been in use for years, typically modern tenon cutters are comprised of power tenon cutters, woofer tenon machines, Tenonizer, and router jigs.

Some components of the draw-jointing process have been mechanized. Mortise-and-tenon joints, for example, were originally cut entirely by hand.

Prior art U.S. Pat. No. 224,752, issued Feb. 17, 1880 to White, provides a machine for producing tenons of elliptical or other variable forms. The tenoning machine includes cutters to which variable motions are imparted by means of a sliding rod operating at a right angle to the line of the sliding motions of the cutter-heads. The tenoning machine also comprises a connected cam and a key, by which movements of the cutter-heads are controlled and the cutters caused to advance and recede to and from the piece of wood or bolt to be tenoned.

Prior art U.S. Pat No. 737,450, issued Aug. 25, 1903 to McNaul, shows a tenoning machine for making tenons in one or both ends of timber adapted for use in shoring mines and for other purposes. The machine embodies a carriage adapted to automatically load itself with a log and equipped with a dog which at one end of the machine is operated automatically to clamp the log, while at the other end of the machine the dog is released in like manner and prior to the discharge of the finished log from the machine. As the loaded carriage moves through the machine the log is presented to a gang of four saws, which operate in two directions to remove slabs from the ends of the log, after which the carriage is rocked or turned in a way to give a quarter turn to the log. The continued movement of the carriage presents the log to a second gang of saws, which operate on the partially finished log to remove the other pieces or slabs therefrom and to complete the tenons on the ends of the log. The carriage is now reversed or restored to its initial position, and as it approaches the delivery end of the machine the dog is retracted and finally the log, with completely formed tenons on its ends, is discharged automatically.

Prior art U.S. Pat. No. 1,844,057, issued Feb. 9, 1932 to Buchan, claims a tenoning machine from which tenons may be quickly and accurately cut on the ends of large timbers such as are commonly employed in the building of cribs, docks and framing.

Prior art U.S. Pat. No. 2,167,082, issued Jul. 25, 1939 to Morris, describes a tenon cutting device that may be applied to a work bench. The device provides means by which a board or the like may be held and an end thereof cut to form a tenon which may be a straight tongue or of dovetail formation.

Prior art U.S. Pat. No. 2,715,924, issued Aug. 23, 1955 to Norris, discloses a manually controlled device for turning integral dowels. The device is adapted for use in connection with a table-type circular saw unit, for turning an integral dowel on the end of a wooden work piece, as for example, on the end of a chair leg or chair rung.

Prior art U.S. Pat. No. 4,593,735, issued Jun. 10, 1986 to Wirth, Jr., indicates an apparatus for woodworking which functions include boring, mortising, tenoning, forming dovetails, duplicating a three dimensional object, and the like. The invention embodies means for providing movement of a workpiece in a horizontal plane or X-Y direction, and means for providing vertical cutting tool movement.

Prior art U.S. Pat. No. 5,494,089, issued Feb. 27, 1996 to Lubbe, puts forth a mortise and tenon jig for a router device that includes a base structure; and a mounting member joined to the base structure, being attachable to a support structure such as a table. The invention further includes first spaced apart parallel elongated guiding members; second spaced apart parallel elongated guiding members; a router support member for operatively supporting a router device; first sliding members attached to the second guiding members for slidingly supporting these relative to the first guiding members; and second sliding members slidingly mounted on the second guiding members. An attachment member is provided for attaching the router support member to the second sliding members. Clamping plates are slidably joined to the base structure. Stop means for limiting movement of the first and second sliding members are provided. Finally a tenon template support member is connected to the second sliding members; and a template guide member for moving along a tenon profile template is joined to the template support member.

Prior art U.S. Pat. No. 5,123,463, issued Jun. 23, 1992 to Grisley, concerns a jig for guiding a power tool that has a cutter bit to cut joint members in workpieces. The jig includes a base frame having a tool support surface and a workpiece support surface. A pair of guide arms are releasably attachable to the power tool. A track is formed on the tool support surface adapted to slidably receive one of the guide arms. A template is releasably securable to the tool support surface having guide surfaces engagable by the other of the guide arms. The track and template co-operate to guide movement of the power tool atop the tool support surface. A clamping system is provided for securing workpieces to the workpiece support surface in a position to be cut by the power tool slidably supported on the tool support surface and guided by the track and the template to provide a joint member in one workpiece and a complementary joint member in another workpiece.

Prior art U.S. Pat. No. 5,025,841, issued Jun. 25, 1991 to Totten, illustrates a table that includes a support member having a work surface with an opening extending through the support member and the work surface. A first mechanism for mounting a router with the support member is provided. A router bit extends generally vertically through the opening and beyond the work surface. A second mechanism for mounting the router with the support member is provided so that the router bit extends generally parallel with the work surface. A mechanism for adjusting the dimension between the router bit and the work surface when the router is mounted with the second mechanism is also provided. The support member has a recess for receiving at least a portion of the router bit below the level of the work surface when the router is mounted with the second mechanism.

Prior art U.S. Pat. No. 4,741,370, issued May 3, 1988 to Heaton, is for a woodworking apparatus that comprises a support table having a flat, circular table surface. The apparatus also includes a first power driven cutting tool mounted below the table surface having a spindle adapted to project upwardly through an orifice in the center of the table surface, and a second power driven cutting tool mounted off-center from the first cutting tool below the table surface and having a spindle adapted to project upwardly through an orifice in the table surface. A guide fence is mounted above said table surface on a chord thereof, means for adjusting said guide fence relative to said cutting tools radially of the circular table surface between a position substantially central of the table surface diametral thereof to a retracted chordal position; and means for adjusting said guide fence angularly about the table surface, whereby the effective distance between the two cutting tools can be selectively adjusted by radial and angular adjustment of the said guide fence. The means for adjusting the guide fence radially comprises a rearward extension forward on the guide fence centrally thereof, said rearward extension having a radial slot, and said means for adjusting the guide fence angularly about the table surface comprises a bracket having attachment means for securing the bracket to the table surface, said bracket having a radial recess for receiving the said rearward extension for sliding radial travel therein. Means are provided for selectively locking the rearward extension in said radial recess for radial adjustment of the guide fence over the circular table surface. The circular table surface preferably has a circular edge perimeter, the bracket is arcuate, and the attachment means secure the bracket to the table circular edge as a downwardly extending peripheral flange.

Prior art U.S. Pat. No. 6,004,082, issued Dec. 21, 1999 to Ruhlmann, provides a rotating tenon cutter having a wooden or aluminum body and a curved cutter blade positioned adjacent to a throat having a bell mouth with a matching curve. A cylindrical tenon is formed with an attractive shoulder that curves from the tenon to the largest cross-sectional dimension of the work piece on the same radius as the cutter blade. A bubble level vial in the body indicates when the axis of rotation (and axis of the tenon to be formed) is horizontal. The cutter blade is repositionable on the body so that the bevel is appropriately presented for sharpening using a drum sander while the face or a flat side of the tenon cutter body rests on a drill press table.

Prior art U.S. Pat. No. 4,738,574, issued Apr. 19, 1988 to Emmert, shows a router jig apparatus that includes a base portion, a router positioning portion, a workpiece orbiting portion and a workpiece positioning portion. The base portion includes a quadrangular frame section disposed generally horizontally and a supporting stand extending downwardly from the frame section. The router positioning portion includes a plate section slidably engageable with the frame section, the plate section includes a central first opening of a shape to pass a motor of an inverted router and retain a work surface surrounding a bit thereof. The workpiece orbiting portion includes a guide section disposed above and closely adjacent to the frame section, the guide section including a large circular second opening therein. A disc member is rotatably positioned within the guide section opening, generally in a common plane therewith, the disc member including a central third opening. The workpiece positioning portion includes a support section resting on the disc member and a horizontally pivotable section carried by the support section. An upstanding specimen holding section has its lower end affixed to the pivotable section on a free side thereof and extends upwardly therefrom with securing mechanism for fixing the inclination of the upstanding section and specimen retaining mechanism disposed along the length of the upstanding holding section.

Prior art U.S. Pat. No. 4,328,847, issued May 11, 1982 to King, Sr., claims a pair of routers that are serially mounted on a pivotable support on a cutting table such that the routers may be adjusted in unison relative to the table. In addition the routers are adjustable relative to each other in a seesaw manner about a central cutting axis so as to maintain the axis. The apparatus and process of the present invention is particularly useful for making the male and female cuts of a dovetail joint in a single operation without requiring any adjustment of the routers relative to each other after the initial positioning. Depending on the cutting tool employed, dovetails, splines, rabbet cuts, mortise and tenon joints and countless other cuts may be made.

Prior art U.S. Pat. No. 5,655,583, issued Aug. 12, 1997 to Heintzeman, describes a tenonizer apparatus that has a motor and a circular cutting blade assembly mounted on a pivotable platform. A radius shoulder support shaft is pivotably mounted perpendicular to the circular cutting blade. The operator pushes and rotates the log along the shafts to create the tenon. Only one tenon can be cut at a time. A minimal set up time is required to switch between tenon types. The pivotable platform allows variable length tenons to be cut. The apparatus is portable.

Prior art U.S. Pat. No. 4,915,149, issued Apr. 10, 1990 to Herenyi, discloses a new method for the production of furniture comprising the steps of providing tree trunks and branches; debarking, drying and cutting said tree trunks or branches to the desired size; producing tenons and mortises in respective ends of said cut tree trunks or branches, said tenons being sized to cooperatively engage said mortises; and assembling furniture from said cut tree trunks or branches by inserting said tenons into said mortises in order to fix respective tree trunks or branches to one another.

Prior art U.S. Pat. No. 5,285,832, issued Feb. 15, 1994 to Gibson, indicates a combination dovetail, mortise and tenon jig, that includes a base unit which is used as a means of supporting different templates thereon, for use in forming the necessary elements involved in both dovetail and mortise and tenon joinery, the common elements being useful for both and providing accurate and consistently formed parts which are intended to interengage and perform the functions required of dovetail and mortise and tenon joints.

Prior art U.S. Pat. No. 6,363,982, issued Apr. 2, 2002 to Nixon, Jr., puts forth a double mortising, tenoning and dovetailing wood working machine that includes a base member, a sliding member and locking members. The base member is mounted on a table. The sliding member and locking members serve to precisely locate the base member relative to a piece of wood stock. The base member can be located over a piece of wood stock, locked into place and have a tenon or tail cut on the stock. The base member can then be moved horizontally over the stock, locked into position and have a second tenon or tail cut on the stock. The stock is then removed and replaced with another piece of wood stock to receive the mortise or socket joints. Through the use of the locking members and the slide member the base member can be located over the stock in the exact location needed to cut the mortise or socket joints to allow for a precise double mortise-tenon or dovetail joint.

Prior art U.S. Pat. No. 5,492,160, issued Feb. 20, 1996 to McCracken, concerns a mortise and tenon generating system that has a removable tenon template which attaches to the work piece. A router utilizing a router bit with a bearing collar is guided so that the bearing collar circumferentially contacts a guide edge on the tenon template and machines the tenon out of the work piece. A router jig with a tilting table having a machining opening is provided for supporting the router and receiving the router bit. The router jig also includes a clamp assembly with a rotatable guide member for receiving the work piece. The tilting table and rotatable guide member allow the work piece to be oriented at a variety of angles with respect to the router bit, for the creation of angled and compound angled tenons and/or mortises.

Prior art U.S. Pat. No. 4,938,263, issued Jul. 3, 1990 to Wrightman, illustrates a machine for cutting logs to provide a dovetail log joint. The machine has a number of saw legs which are slidably mounted on carriages, some of which are movable in order to adjust the angle of inclination of the saw blades. This machine permits dovetail tenons to be formed at either end of a log to provide both inside and outside corner joints. All of the necessary cuts can be effected while the log is held in a fixed position, it is only necessary to move the log longitudinally of itself in order to form the tenons at opposite ends. C-clamps are also provided for applying pressure to the log joint during assembly of the joint.

The main problem with conventional tenon cutters is that power tenon cutters require a ½" drive drill and a vise. Tenon lengths are restricted to the size of the tenon cutter usually 5 to 6 inches. If tenon cutters are started in the wrong direction against wood ends they can kick away. Tenon cutters can also spin a piece of wood out of a vise causing injury to the user. Another problem with conventional tenon cutters are tenon machines are too expensive and cost from $2,900 to $5,265. Another problem with conventional tenon cutters are, that the Tenonizer is a tablesaw attachment that requires the user to buy a table saw plus the attachment. Another problem with conventional tenon cutters are router jigs limit tenon length & diameter.

While these devices may be suitable for the particular purpose to which they address, they are not as suitable for making a hand-turned tenon on the end of a piece of wood that has a threaded groove.

SUMMARY OF THE INVENTION

In these respects, the tenon maker according to the present invention substantially departs from the conventional concepts and designs of the prior art, and in so doing provides an apparatus primarily developed for the purpose of making a hand-turned tenon on the end of a piece of wood that has a threaded groove.

The general purpose of the present invention, which will be described subsequently in greater detail, is to provide a new tenon maker that has many of the advantages of the tenon cutters mentioned heretofore and many novel features that result in a new tenon maker which is not anticipated, rendered obvious, suggested, or even implied by any of the prior art tenon cutters, either alone or in any combination thereof.

To attain this, the present invention generally comprises a stand made up of two channel shaped sides, a removable top that has holes drilled in it so a router with a router bit can be attached, and a removable wood guide having a front with two attached wood guide sides. The electric router is the power source for the cutter. The round nose bit, with a cutting diameter of. 1-½", cutting radius of ¾", cutting length of 1", shank diameter of. ½, cuts wood ends. The top will be a flat material with holes that will support a router and attach to the sides. The two channel shaped sides will include holes for attaching a top, securing to a work bench and attaching wood guides. The wood guides have a front with the different diameter holes. The wood guide front attaches to two wood guide sides. The wood guide sides will be a flat material, each having holes and slot for attaching to wood guides and channel sides.

There has thus been outlined, rather broadly, the more important features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a tenon maker that will overcome the shortcomings of the prior art devices.

An object of the present invention is to provide a tenon maker for making a hand turned tenon on the end of a piece of wood that has a threaded groove.

Another object of the present invention is for making a tenon on the end of a piece of wood that can be any length or diameter.

Another object of the present invention is for utilizing the power of one or two routers.

Another object is to provide a tenon maker that will form different size cylindrical shaped tenons with threaded grooves on wood ends.

Another object is to provide a tenon maker that can be mounted over a table mounted router.

Another object is to provide a tenon maker where no vise is required.

Another object is to provide a tenon maker that allows the user to produce different variations of tenon diameters.

Another object is to provide a tenon maker that allows the user to produce different variations of tenon shapes using differently shaped router heads or bits, such as square shoulder tenons with a straight router bit and radius shoulder tenons with a round-nosed router bit, and chamfer (taper) shoulder tenons with a chamfer router bit.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated.

BRIEF DESCRIPTION OF THE DRAWINGS

These and other details of my invention will be described in connection with the accompanying drawings, which are furnished only by way of illustration and not in limitation of the invention, and in which drawings.

BEST MODE FOR CARRYING OUT THE INVENTION

Figure 1:
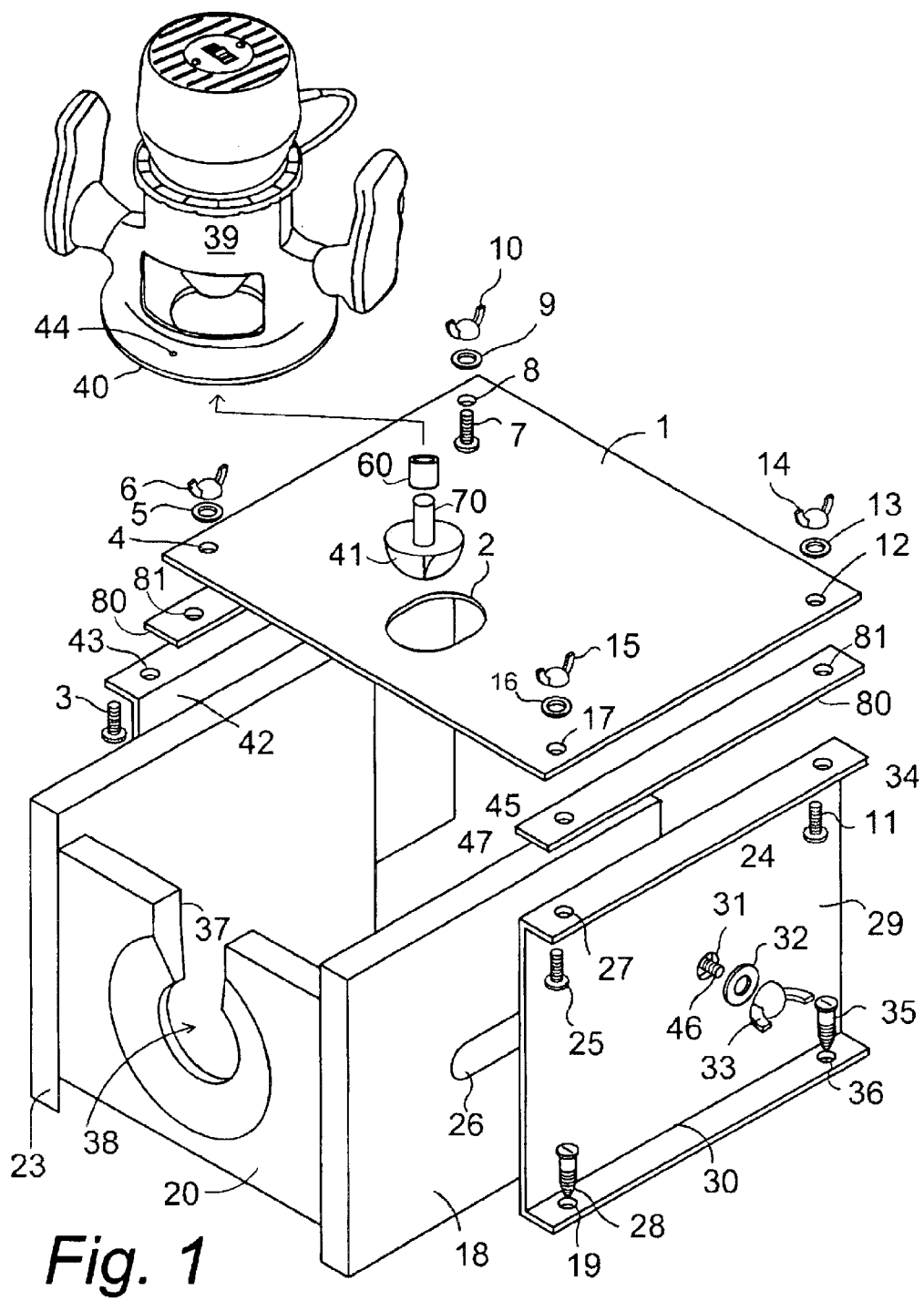
FIG. 1 is an exploded perspective view of the present invention showing all of the components.

Turning now descriptively to the drawings, in which similar reference characters denote similar elements throughout the several views, the attached figures illustrate a tenon maker, which comprises a stand made up of two channel shaped stand sides 29 and 42, a removable stand top 1 that has at least one hole 2 drilled in it so a router 39 with a rotatable cutting router head 41 can be attached, and a removable wood guide having a front wood guide plate 20 with two attached guide sides 18 and 23. The electric router motor of the router 39 is the power source for the cutter. The round nose bit or router head 41 with a cutting diameter of 1-½", cutting radius ¾", cutting length 1", shank dia. ½" cuts wood ends to form tenons.

Figure 12:
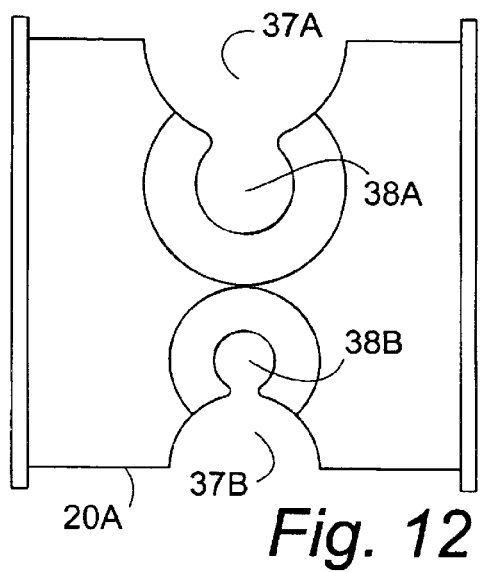
FIG. 12 is a front elevational view of the preferred embodiment of the wood guide with two tenon holes of different sizes.
Figure 13:
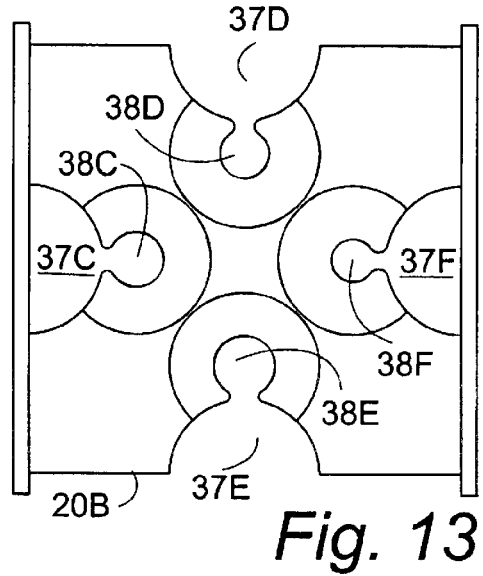
FIG. 13 is a front elevational view of an alternate embodiment of the wood guide with four tenon holes of different sizes.

The two channel shaped stand sides 29 and 42 include top holes 27, 34 and 43 for attaching the removable top 1, and bottom holes 19 and 36 for securing the sides to a work bench or base, and side holes 31 for attaching a sliding and locking means such as a threaded shaft 46 and butterfly nut 33 for the wood guides, which can each have a single wood guide hole 38 of a specific size with several different wood guides having differently sized wood guide holes or more than one wood guide hole of different sizes in a single wood guide as shown in FIGS. 12 and 13. The front wood guide plate 20 attaches to two wood guide sides. The wood guide sides have a flat surface with holes at one end for attaching to the wood guide plate 20 and a slot 26 on at least one wood guide side for sliding the wood guides into the stand and attaching the wood guides to the stand sides by means of a threaded shaft 31 on a screw or bolt and a butterfly nut 33.

Figure 3:
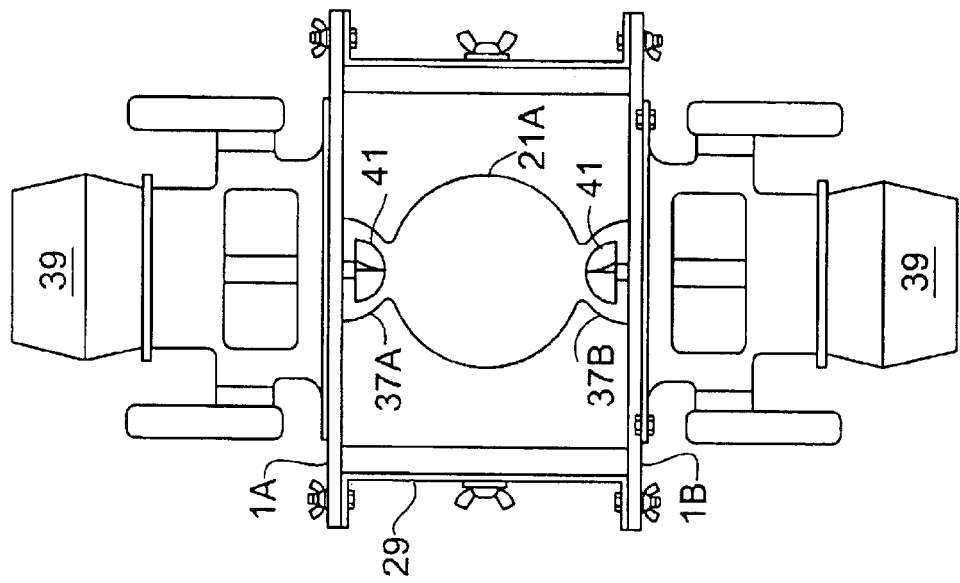
FIG. 3 is a front elevational view of the present invention showing two routers.
Figure 2:
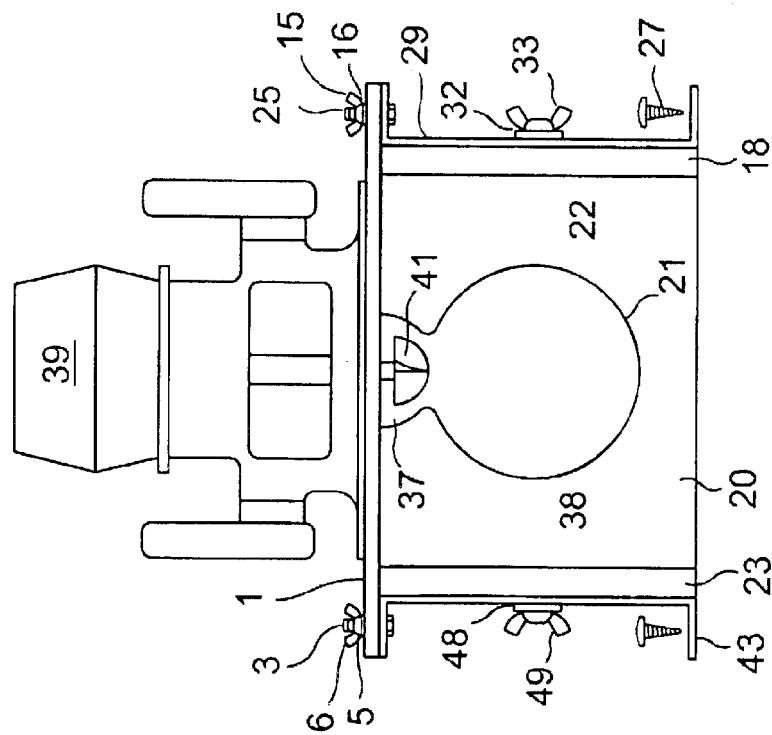
FIG. 2 is a front elevational view of the present invention illustrating a top mounted router.

The electric router is the power source for the cutter. The router 39 as shown in FIGS. 1 through 3 is a conventional router, an electric power tool that turns a router bit or router head 41 at a high RPM. Routers 39 with a router bit 41 can cut through a variety of materials including wood. Routers 39 have a depth adjustment, allowing the router bits to be raised or lowered through a wood guide slot 37 in the wood guide plate 20. The router bit 41 can be lowered to the top of tenon guide hole 38 in the wood guide 20. The router sub-base 40 can be removed, along with the sub-base screws 44. The router 39 can then be attached to top router holes that can be drilled in the top 1 to match holes drilled in sub-base 40. Sub-base screws 44 can be used again to attach top 1 to router base.

The router 39 is to be centered and attached at a router hole 2 that is pre-drilled in top 1. A sleeve 60, which may be cut from clear plastic tubing, fits over a rotatable shaft 70 of the router head 41 as an aid for aligning the router head in a center of the router hole 2. Two routers 39, shown in FIG. 3, can be attached one router 39 attached to the top plate 1A and supported by channel sides 29 and 43 secured to the top plate 1B of a table mounted router 39. A special wood guide 20 is required with a wood guide slot 37 at top and bottom.

Figure 8:
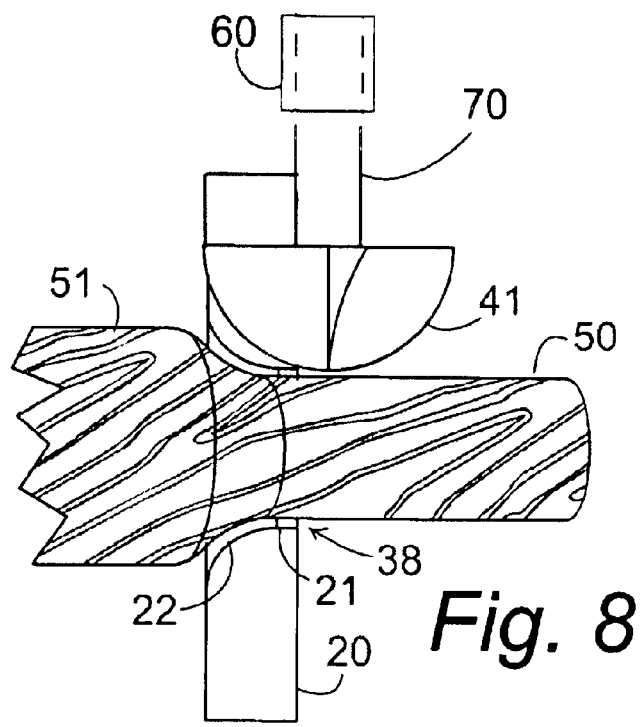
FIG. 8 is a side elevational view in partial section of the wood end with a radius shoulder tenon, a round-nosed router bit, and radius opening wood guide.
Figure 11:
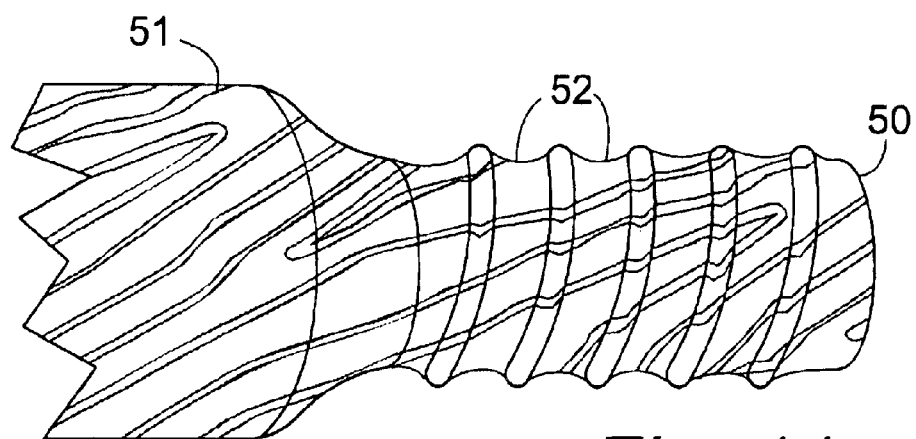
FIG. 11 is a side elevational view of a piece of wood showing a threaded tenon on the end of the piece of wood.

The round nose bit which has a cutting diameter of 1-½", a cutting radius ¾", a cutting length 1", a shank diameter ½" cuts wood ends. Router bits 41 are shown in FIGS. 1, 2, 3, and 8. The router bit 41 creates a radius shouldered tenon as seen in FIGS. 8 and 11. The wood guide opening 38 is positioned in the wood guide plate 20 so that an end point of the router head 41 is aligned within a point inside the at least one wood guide opening 38 so that turning the piece of wood while advancing the piece of wood toward the router (wood ends are pushed and hand turned into the wood guides 20) coming in contact with router bits 41 which creates a threaded groove 52 the length of the tenon, 50 as seen in FIG. 11. Router bits 41 with ¼" shank can be used in routers 39 that can not use a ½" shank. A different router bit then 41 can be used to make a square shoulder tenon. The bit needs to be a straight bit that has a 1" cutting diameter and a 1" cutting length. The shank diameter can be ¼" to ½".

Figure 7:
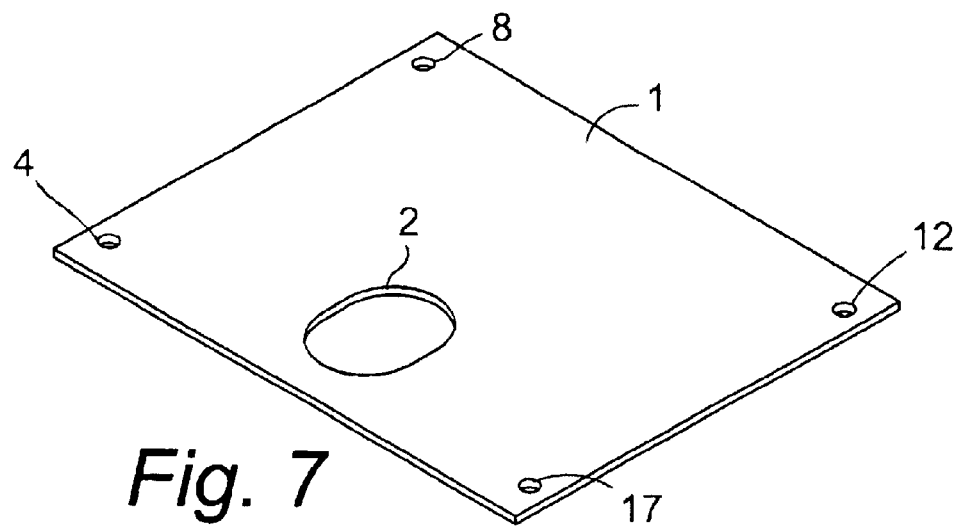
FIG. 7 is a perspective view of the top of the stand of the present invention.

The top will be a flat surface with holes that will support a router and attach to the sides. Top 1 shown in FIGS. 1, 2, 3 and 7 will be made out of a clear Lexan, Nat Delrin or a Phenolic. Top 1 in FIG. 7 has 4 holes drilled 4, 17, 8, 12. Four holes 4, 17, 8, 12, will be pre-drilled for channel sides 29 and 43 to attach with bolts 11, 7, 3, 25, lock washers 5, 9, 13, 16 and four wing-nuts 6, 10, 14, 15. This will secure top 1 to sides 29 and 43. There will be a 1⅝" router hole 2 drilled approximately 3" in and centered between two sides of top 1. Top 1 will replace Router 39 sub-base 40. Top 1 will be ¼ thick. Tops could be pre-drilled to match router 39 sub-bases 40. At least one shim 80 with attaching holes 81 may be inserted on each of the two stand sides, the at least one shim capable of being inserted between the stand side and the removable top 1 to adjust the position of the router head 41 within the stand.

Figure 4:
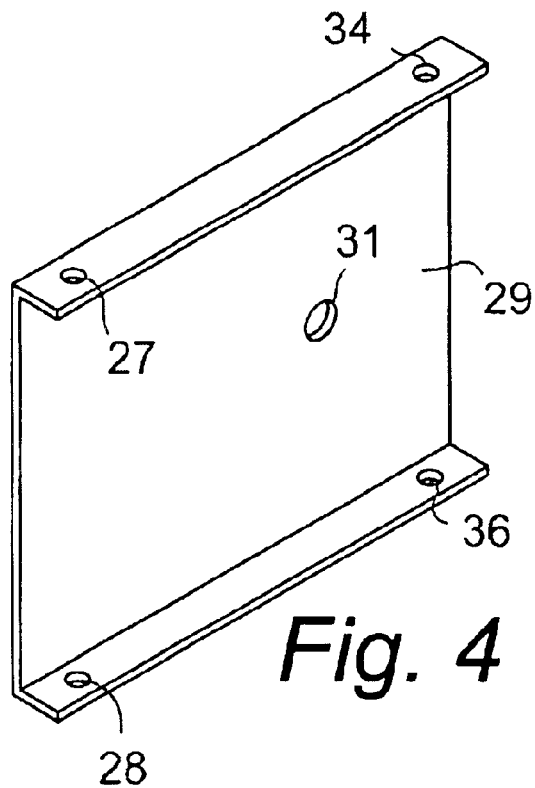
FIG. 4 is a perspective view of the present invention showing a channel side.
Figure 5:
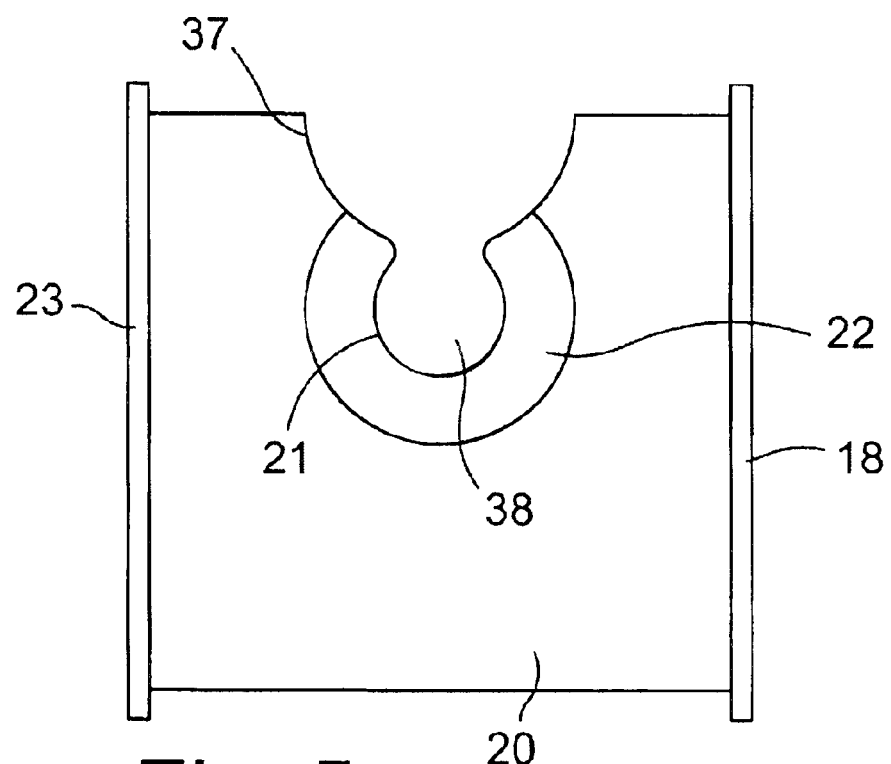
FIG. 5 is a front elevational view of the present invention showing a wood guide.
Figure 6:
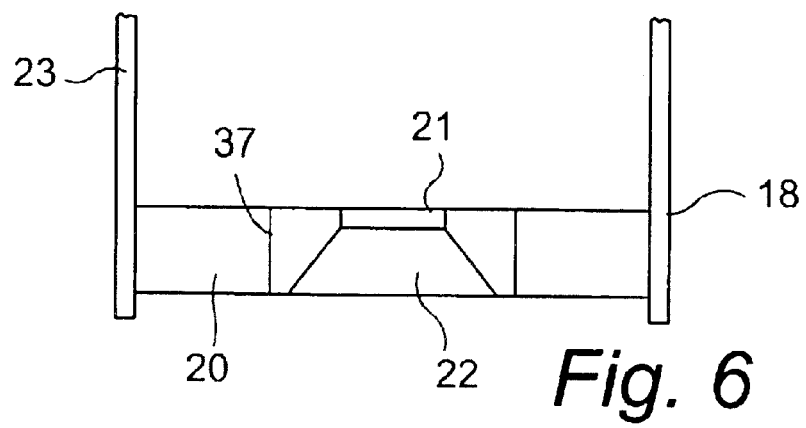
FIG. 6 is a top partial plan view of the wood guide of the present invention.
Figure 10:
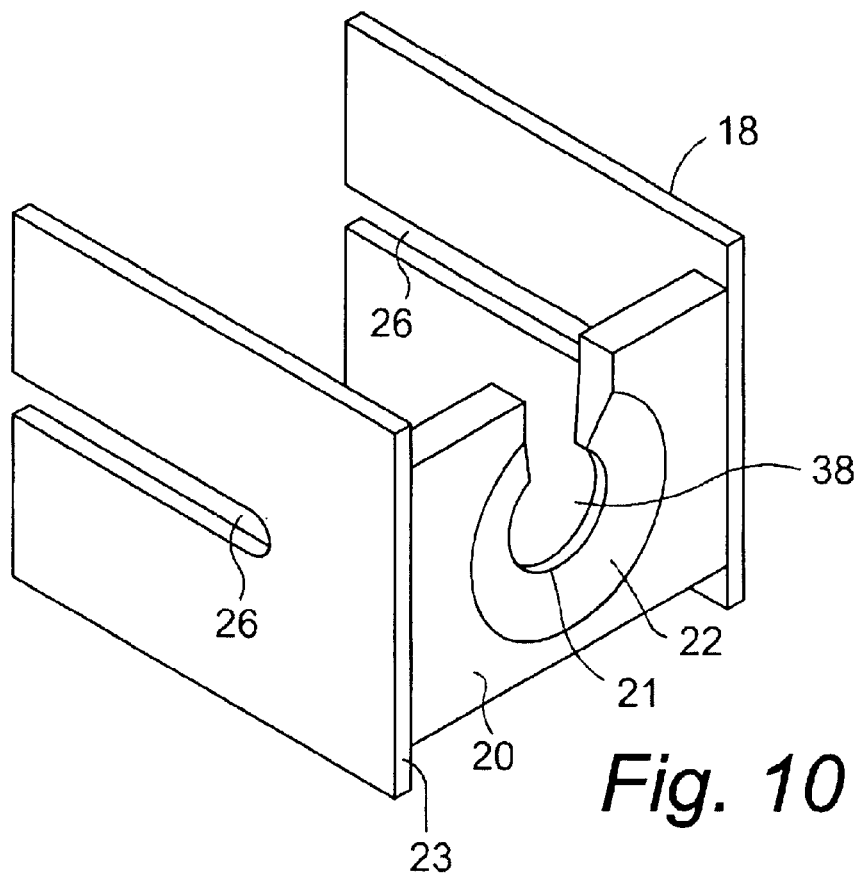
FIG. 10 is a perspective view of the wood guide of the present invention.

The two channel shaped sides will include holes for attaching a top, securing to a work bench and attaching wood guides. Channel sides 29, and 43 shown in FIGS. 1, 2, 3, and 4 are made of 16 gauge steel giving the support necessary to top 1. Pre-drilled holes 25, 34, as shown in FIG. 4 are holes that will be aligned with pre-drilled holes 17, and 12 in top 1. As shown in FIG. 1 bolts 26 and 11, lock washers 16 and 12 and wing-nuts 15 and 14 will attach channel sides 29 to top 1. Channel side 43 will be attached to top 1 also using bolts, lock washers, and wing-nuts. A pre-drilled hole 31 and 45 in channel sides 29 and 43 will align with the guide slot 26 shown in FIGS. 1 and 10. Slots are in wood guide sides 18 and 23. Bolts 46,47 will pass through slots 26 and through holes 45, 31, in channel sides 43, 29. Lock washers 32 and 48, wing-nuts 33 and 49 will secure wood guide sides 18 and 23 to channel sides 29, 43. Bolts 46 and 47 will allow wood guide sides 18, 23 a guide to slide from front to back. Wing-nut 33 and 49 can tighten or loosen and this will become an adjustment for positioning wood guide 20 from front to back. Pre-drilled holes 28, 36 as shown in FIG. 4 are for attaching channel sides to a work bench. Channel sides could be made out of plastics, Phenolic or Nat Delrin.

The wood guides having a front with different diameter holes, wood guide front attaches to two wood guide sides. Wood guides 20, shown in FIGS. 1, 2, 3, 5, 6, 8, 9, 10, are attached to wood guide sides 18, 23. Wood guides 20 will be made out of a material that a router bit 41 can cut. Possible material to be used for wood guide 20 will be PVC or polyethylene. Wood guide 20 needs to be made out of a smooth hard surface that will allow a wood piece 51 shown in FIG. 8 to be hand turned against it with the least amount of resistance. Wood guide 20 will be 1" thick, this will allow for ¾" radius 22 to ¼" deep guide 21. There will be different diameter tenon holes 38 drilled in wood guides 20 to create different size tenons. Different size wood guides 20 will be made to create different size tenons 50 on the ends of the pieces of wood 51.

Figure 9:
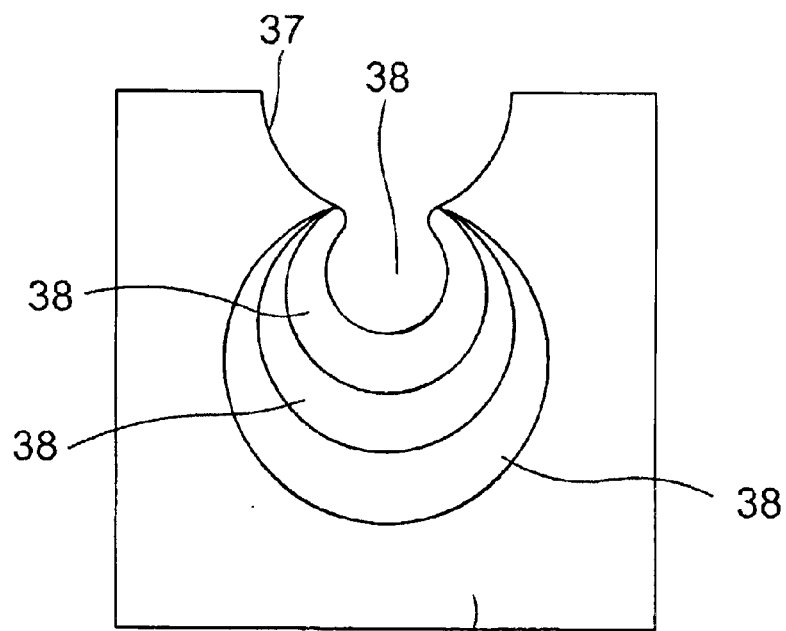
FIG. 9 is a front elevational view of the present invention showing the relative positioning of various sizes of holes in the wood guides.

FIG. 9 shows wood guide 20 with different diameter tenon holes 38. The tops of all tenon holes 38 will be located at the bottom of router bit notch 37. Router bit notch 37 will allow router bit 41 to be raised and lowered through router notch 37. Raising and lowering of the router bit 41 will create a variation of tenon diameters. Wood guides 20 will attach to wood guide sides 18, 23 with glue or screws. As shown in FIG. 3 wood guide 20 has two router bit notches 37. This type of wood guide will be made to utilize the power of two routers 9. This wood guide 20 will be made out of the same material as other wood guides 20.

The wood guide sides have a flat surface, each has holes at one end and a slot for attaching to wood guides and channel sides. Wood guides sides 18, 23, shown in FIGS. 1, 2, 3, 5, 6, 10, will be made out of plastic. Wood guide sides 18, 23 will attach to wood guide 20 with screws or glue. Wood guide sides 18, 23 have a slot 26, bolts 46, 47 slide through slots 26. This creates an adjustment of wood guide 20 allowing the user to position wood guide in the desired alignment to router bit 41. Wood guide sides could be made out of metal.

Shown in FIG. 2, two channel sides 29, 43 support a top 1. Top 1 is secured to the two channel sides using bolts, lock washers and wing-nuts 3, 6, 5, 16, 25, 15. Shown in FIG. 1, bolts, lock-washers and wing-nuts 7, 9, 10, 11, 13, 14 attach top 1 back to top of channel sides 29, 43. There will be pre-drilled holes drilled in top 1 that will align with pre-drilled holes on the tops of channel sides 29, 43. Shown in FIG. 1, most conventional routers 39 on the market today come with a sub-base 40. Sub-base 40 is removed from the router 39 and top 1 becomes the new sub-base. To do this, sub-base screws 44 need to be removed from router sub-base which in most cases there are 4 sub-base screws. Router 39 is placed on top 1 and centered using a pre-drilled router hole 2 as a guide. New holes are drilled in top 1, and sub-base screws 44 are used to attach router 39 to top 1. The top 1 has now secured two channel sides 29, 43, and is now supporting and securing the router 39. The two channel sides 29, 43, can be secured to a work bench or table top using wood screws, lag bolts or bolts and nuts. The two channel sides 29, 43, and the top 1 become a stand that holds a router 39 in a stationary position. A router bit 41 is placed in the router 39. Wood guide 20 that has two sides attached to it 18, 23 becomes one unit. This unit slides in between the two channel sides 29, 43. The wood guide sides 18, 23 slide on the surface of a table top or work bench. FIG. 1 shows a wood guide unit out. If the wood guide unit were slid in, then wood guide sides 18, 23 would slide on a work bench or table top surface aligning the slots 26 shown in FIGS. 1 and 10 with bolts 46, 47. Lock washers and wingnuts or butterfly nuts 32, 33, 48, 49, are used to loosen or tighten on bolts 46, 47. Loosening wing-nuts 33, 49, will allow wood guide unit to slide freely between two channel sides 29, 43. Tightening wing-nuts 33, 49 will lock the wood guide unit in place. This function makes the wood guide unit adjustable. The wood guide unit needs to be adjustable. The center of the router bit 41 shown in FIG. 8 needs to align with the beginning of ¼" guide 21. This will put the wood guide 20 in its correct position to the router bit 41. One of the adjustments of a router 39 is the router bit 41 can be raised or lowered. This allows router bit 41 to be raised or lowered through router notch 37. Bottom of the router bit 41 can be lowered to top of hole 38 putting router bit in its best cutting position. Router bit 41 can be lowered to below the top of the hole 38 to create a variation in tenon diameter. Wood guides 20 with different diameter holes 38 will be manufactured. When holes 38 in wood guides 20 become larger than 2¾", it will be necessary to make a larger wood guide 20. One set of wood guides 20 will have a variation of holes 38 drilled in them to make different size tenons on wood ends from ¼" to 2¾". Note each wood guide 20 will have one size hole drilled in it and a ¾" radius 22 and a ¼" guide 21. Another set of wood guides 20 will be made with holes 38 starting at 2⅞" to 5½". This larger set of wood guides will require that channel sides 29, 43, be increased in height, the top 1 to be increased in width, wood guide sides 18, 23, to be increase in height, and wood guides 20 increase in height and width. Increasing the cutting length of router bit 41 would allow for larger wood ends to be cut down to tenon size.

This invention shown in FIG. 1 is used for putting cylindrical-shaped tenons on wood ends using a router 39. Routers are manufactured by power tool manufacturers. Routers 39 are designed to turn a cutter or router bit 41 at a high speed. Router bit 41 is used to shape wood ends. Router bits are manufactured by cutting tool companies. The router 39 and the router bit are placed on and attached to a top 1. Top 1 is a square cut out of a 4 ft.×8 ft. sheet of ¼" clear lexan that will have 5 pre-drilled holes in it 2, 4, 17, 12, 8. The top will be supported by two channel sides 29, 43. Channel sides 29, 43, can also be called metal tract. Pieces of this metal tract will be cut to length and holes will be drilled in them for securing top 1 to channel sides and for securing channel sides 29, 43 to a work bench or table top. One hole 31, drilled in channel side 29, and one hole 45, drilled in channel side 43 will be for bolts 46, 47. Bolts will become a guide for wood guide sides 18, 23. There are slots 26, cut out in wood guide sides 18, 23, for the bolts 46, 47, to slide in. Wood guide sides 18, 23, will be square pieces cut out of 4 ft. by 8 ft sheets of ¼" plastic material. To lock wood guide sides in place, lock washers and wing-nuts 48, 49, 32, 33, will be used. Wood guides 20 will be made with different diameter holes 38 drilled in them. This will allow the user of this invention to put different diameter cylindrical-shaped tenons on wood ends. All wood guides will have a ¾"radius, 21, ¼" guide and a notch 37 for a router bit to drop down through. Wood guides will be squares cut out of a 4 ft.×8 ft. 1" thick plastic material. To start making tenons on wood ends, attach router 39 to top 1. Put router bit 41 in router 39. Attach top 1 to channel sides 29 and 43 using bolts, lock washers and wing-nuts 11, 13, 14, 7, 9, 10, 3, 5, 6, 25, 15, 16. Slide in wood guide 20 that will be attached to wood guide sides 18 and 23. Put bolts 46, 47 through slots in wood guide sides 18, 23 and through holes 45, 31 in channel sides 29, 43. Put lock washers and wing-nuts 48, 49, 32, 33 on bolts 46, 47. Attach channel sides 29, 43 to work bench or table top using wood screws, lag bolts, or bolts and nuts. This invention has two important adjustments. One adjustment is adjusting the wood guide 20. The ¼" guide 21 needs to be adjusted to directly below the center of the router bit 41. Slide wood guide 20 in and lock in that position with wing-nuts 33, 49. The second adjustment is adjusting the depth of the router bit 41. Routers have an adjustment to raise and lower the router bits. Drop the bottom center of router bit to the top center of hole 38 shown in FIG. 8. If bottom center of router bit is dropped below top of hole 38, a smaller tenon would be the end result. This would allow the user of this invention to a make variations of tenon diameters using one wood guide 20. If the router bit 41 is dropped down too far, one looses the ¼" guide 21 and tenons become uneven. The way this invention makes a tenon on a wood end is shown in FIG. 8. A piece of wood is pushed into a wood guide 20. The piece of wood can be up to a maximum of 2" larger in diameter than the wood guide hole. The reason for this is the router bit 41 has a 1" cutting length that leaves a 1" cut above hole 38 shown in FIG. 8. With the router on, push a piece of wood into the wood guide 20. The router bit will start to shape the wood end to the ¾" radius 22. In order to shape the entire diameter of the wood end, it needs to be rotated in the direction shown in FIG. 8 against the direction of the router bit 41. Wood needs to be hand turned in order to make a tenon on the end of a piece of wood. Hand turning the wood allows the user to control the direction of the tenon being made and the time it takes to make it. When the wood end is shaped to ¾" radius 22, it then enters the ¼" guide 21. The ¼" guide 21 will help to hold the direction of the tenon being hand turned. Because the wood end is being hand turned and pushed through and against the router bit 41, it creates a threaded groove 52. The threaded grove is the result of the router bit being slightly lowered below the top of the hole 38. The lower the depth of the router the wider and deeper the groove on the tenons being hand turned. The raising and lowering of the router bit 41 allows the user of this invention to make variations of tenon diameters and variations of threaded grooves. There is no back on this invention or anything restricting the user of this invention from making any length of tenon. It takes some physical skill to use this invention and make a tenon on a wood end. One needs to hold the piece of wood they want to put a tenon on level to the ground and at the same time turn and push wood ends into the wood guide 20. Different wood guides 20 will be made with different diameter holes 38 so users of this invention can make different diameter tenons.

Figure 14:
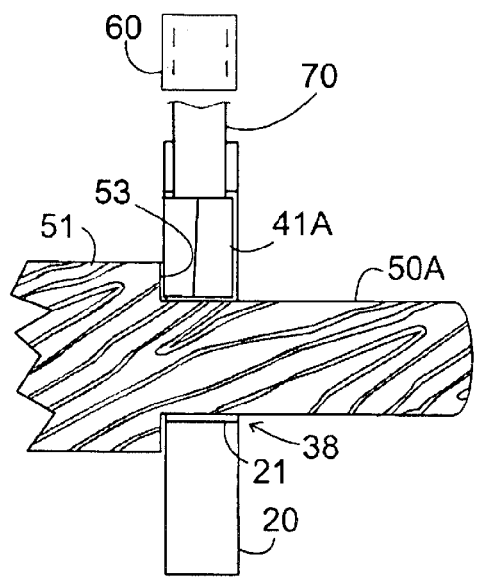
FIG. 14 is a side elevational view in partial section of the wood end with a square-shoulder tenon, a straight router bit, and straight edge wood guide opening.

In FIG. 14, the wood end has an alternate tenon 50A with a square shoulder 53 produced by a straight router bit or router head 41A and a straight edge 21 on the wood guide opening 38. Any variation of router head or router bit may be used to produce different tenon ends of different shapes.

Figure 15:
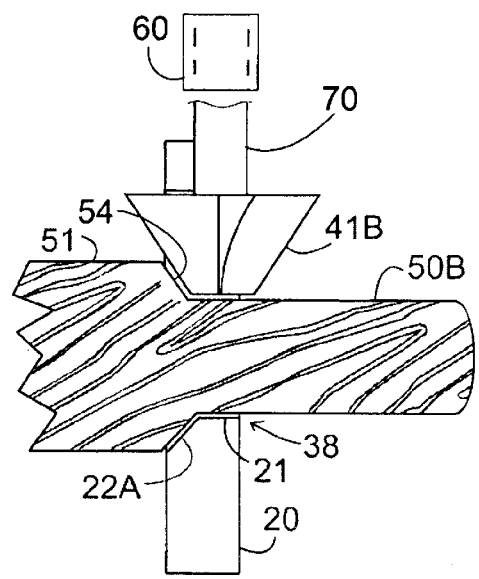
FIG. 15 is a side elevational view in partial section of the wood end with a chamfer-shoulder tenon (tapered shoulder), a chamfer router bit, and tapered or chamfered edge wood guide opening

In FIG. 15, the wood end has an alternate tenon 50B with a chamfer shoulder 54 (or tapered shoulder) produced by a chamfer router bit or router head 41B and a chamfer or tapered edge 22A on the wood guide opening 38.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A tenon maker device for fabricating a tenon on an end of a piece of wood, the device comprising:

a stationary stand having two opposing stand sides and a removable top that has at least one router hole therethrough, the router hole adapted for receiving a router head of at least one conventional router tool inserted within the stand;

a wood guide fitting slidably within the stationary stand, the wood guide having a wood guide plate with at least one wood guide opening therethrough and two opposing guide sides attached to the wood guide plate, the two opposing guide sides adapted for sliding between the two stand sides with a means for sliding the wood guide relative to the stationary stand therebetween and being secured therebetween with a means for locking the wood guide to the stationary stand therebetween, the at least one wood guide opening adapted for receiving an end of a piece of wood therethrough so that the piece of wood is adapted for being turned by a user within the at least one wood guide opening and the end of the piece of wood is adapted for being engaged with the router head by sliding the wood guide into the stand and the router head is adapted for removing a portion of the end of the piece of wood around the perimeter of the end of the piece of wood as the piece of wood is inserted and turned in the at least one wood guide opening to produce a tenon on the end of the piece of wood.

2. The device of claim 1 wherein the means for sliding the wood guide relative to the stationary stand comprises a slot and a protrusion slidably interacting between a guide side and an adjacent stand side, the protrusion adapted for fitting and sliding within the slot enabling the wood guide to slide within the stand.

3. The device of claim 2 wherein the protrusion comprises a threaded shaft and the means for locking the wood guide to the stationary stand comprises a butterfly nut.

4. The device of claim 1 wherein the at least one wood guide opening is positioned in the plate so that an end point of the router head is aligned within a point inside the at least one wood guide opening so that turning the piece of wood while advancing the piece of wood toward the router, enables the router head to produce a tenon with threads on the end of the piece of wood.

5. The device of claim 1 wherein the stand comprises a first removable plate means of holding a router head positioned within the stand, the removable top, and at least one second plate means of holding at least one additional router head positioned within the stand, a top of a table mounted router, so that the router heads simultaneously engage the end of the piece of wood.

6. The device of claim 1 further comprising a sleeve for fitting over a rotatable shaft of the router head as an aid for aligning the router head in a center of the router hole.

7. The device of claim 1 wherein the wood guide further comprises at least one router head opening therethrough structured for receiving a side of the router head therethrough as the wood guide is moved into the stand.

8. The device of claim 1 wherein the wood guide has a series of wood guide openings of various sizes through the wood guide plate for receiving different sizes of pieces of wood therethrough to create tenons of different sizes.

9. The device of claim 1 wherein the wood guide plate further comprises a tapered edge around the at least one wood guide opening to receive a tapered surface of the piece of wood adjacent to the tenon.

10. The device of claim 1 further comprising at least one shim on each of the two stand sides, the at least one shim adapted for being inserted between the stand side and the removable top to adjust the position of the router head within the stand.

11. The device of claim 1 wherein a variety of differently shaped and differently sized router heads may be used alternately to produce tenons having differently shaped shoulders.

12. The device of claim 11 wherein a round-nosed router head is used to produce a tenon having a radius shoulder.

13. The device of claim 11 wherein a straight router head is used to produce a tenon having a square shoulder.

14. The device of claim 13 wherein the router guide opening comprises a straight edge opening.

15. The device of claim 11 wherein a chamfer router head is used to produce a tenon having a chamfer shoulder.

16. The device of claim 15 wherein the router guide opening comprises a chamfer edge opening.

* * * * *